United States Patent [19]

Baxter

[11] Patent Number: 5,388,755
[45] Date of Patent: Feb. 14, 1995

[54] APPARATUS AND METHOD OF BONDING ISOLATION GROOVES OF A RIDGE WAVE-GUIDE LASER DIODE

[75] Inventor: Kevin A. Baxter, Billerica, Mass.
[73] Assignee: Polaroid Corp., Cambridge, Mass.
[21] Appl. No.: 188,567
[22] Filed: Jan. 28, 1994
[51] Int. Cl.⁶ .............................................. B23K 1/008
[52] U.S. Cl. .................... 228/123.1; 228/219
[58] Field of Search ............... 228/121, 123, 219, 220, 228/123.1; 445/28

[56] References Cited

U.S. PATENT DOCUMENTS

| | | | |
|---|---|---|---|
| 3,632,008 | 1/1972 | Lind | 228/121 X |
| 4,645,116 | 2/1987 | Henein et al. | 228/123 |
| 4,836,434 | 6/1989 | Takenaka et al. | 228/219 X |
| 4,974,769 | 12/1990 | Mizuishi | 228/219 |
| 5,141,147 | 8/1992 | Yokota | 228/219 |

*Primary Examiner*—Kenneth J. Ramsey
*Attorney, Agent, or Firm*—Robert A. Sabourin; Edward S. Roman

[57] ABSTRACT

A novel method and apparatus improves the physical and electrical soldering bond between two electronic components by fluctuating the pressure of a non-oxidizing gas in a chamber which houses the two electronic components throughout a period when the solder has been made molten. This results in the solder effectively filling all crevices and grooves present on the surfaces being soldered. The method is particularly advantageous for soldering a ridge wave-guide laser diode P-side down to a heat sink to improve power capability, longevity and performance of the laser diode.

11 Claims, 4 Drawing Sheets

APPARATUS AND METHOD OF BONDING ISOLATION GROOVES OF A RIDGE WAVE-GUIDE LASER DIODE

FIELD OF THE INVENTION

This invention relates generally to a method and apparatus for soldering two electronic components together to provide optimum adhesion of the solder to each surface, regardless of whether the surfaces are planar or irregular. More particularly, the invention relates to a method and apparatus for providing optimum adhesion of solder to grooves of a ridge wave-guide laser diode bonded P-side down to a heat sink.

BACKGROUND OF THE INVENTION

Bonding electronic components by soldering has been done for years. The factors to be considered for creating a strong, enduring, non-corrosive physical and electrical bond between electronic components include: the type of solder used; the nature of the component material composition; the amount and duration of heat required; and the use of anti-oxidation measures such as fluxing. Soldering details vary considerably depending upon other factors such as the size and type of electronic components to be bonded.

With miniature electronic components, bonding technology has become increasingly important especially with the proliferation of microelectronic semiconductor laser diodes such as ridge wave-guide laser diodes.

Laser diodes are tiny devices typically measuring about 750 $\mu$m in length along the optical resonator by 500 $\mu$m in width across the mirror facets by 100 $\mu$m in height from the positive surface (P-side) to the negative surface (N-side). Appreciable heating of the laser diodes occurs during operation, requiring heat sinking for improving operational consistency, preventing component damage, and elongating life expectancy.

One particular type of laser diode of interest is the index guided ridge wave-guide laser diode. In the ridge wave-guide structure, the top of the laser device is etched down to be very close to the active layer. Only a small part of the diode is not etched. This produces a type of plateau above the active layer, which ultimately becomes the lasing region. The evanescent field of propagation wave extends into the plateau region and is efficiently guided in the process. In this structure, the electrical confinement is provided by the opening in the insulating oxide layer. The wave-guides and active regions are typically located on the P-side of the laser diodes. In a typical striped geometry, the wave-guides may be about 3–5 $\mu$m wide, 0.1–0.2 $\mu$m thick and 750 $\mu$m long. The active regions are isolated from one another by grooves coated with non-conductive dielectric layers. Most frequently, ridge wave-guide laser diodes are operated N-side down under low power conditions with a pumping current in the order of 100 mA and power dissipation of about 20 mW. Laser diodes of this type are typically soldered N-side down to a heat sink, i.e. the P-side surface containing the wave-guide grooves is mounted upwards. P-side up operation is conventional since low power operation of ridge wave-guide laser diodes is necessary for many applications, such as coupling optical fibers which would otherwise burn and fail if exposed to higher power laser diodes, and since handling the P-side down can easily cause damage to the laser diodes.

In contrast to the conventional N-side down soldering of ridge wave-guide laser diodes, a few applications require higher power emission in the order of 750 mW or more, which is accommodated by N-side up bonding of the laser diodes to the heat sink. By soldering the laser diodes P-side down to the heat sink, greater dissipation of operating heat from the laser diodes is achieved, allowing cooler operation while simultaneously sustaining a higher operating current. However, bonding the P-side to a heat sink by conventional soldering techniques typically results in incomplete bonding in the grooves of the ridge wave-guide laser diode. This shortcoming in turn results in: reduction in the strength of the bond; a less reliable electrical contact; operational inconsistency; and a loss in heat sinking capability; all of which have negative impacts on operational power.

One practical solution to the above shortcomings of conventional P-side down soldering is recognized in the prior art by filling the grooves of the ridge wave-guide laser diodes with polyimide before soldering so that the interface between the P-side of the laser diodes and the heat sink surface become coplanar while still maintaining proper isolation between active regions. However, filling the grooves with polyimide requires additional laser diode fabrication steps, as well as additional care when handling the polyimide and the diodes. Consequently, there is a need for improved methods for bonding heat sinks to the P-sides of laser diodes.

Accordingly, a primary object of the invention is to provide a method and apparatus for maximizing adhesion and bonding of solder between uneven surfaces to be soldered together.

Another object of the invention is to improve the life expectancy, increase and sustain operating power, and improve reliability of a ridge wave-guide laser diode by an improved method and apparatus for soldering the laser diode to a heat sink.

Yet another object of the invention is to provide increased heat transfer capability between a heat sink soldered to an electronic component when one or both of the surfaces to be soldered are irregular or otherwise not planar.

Other objects of the invention will, in part, appear hereinafter and, in part be easily derived from the following detailed description read in conjunction with the drawings.

SUMMARY OF THE INVENTION

An apparatus and method for bonding two surfaces by soldering is disclosed. The method involves housing the two components to be bonded together in a pressure chamber filled with a nonoxidizing gas and rendering solder between them molten while fluctuating the gas pressure. This results in the solder completely filling all crevices and grooves present on the surfaces being soldered. The inventive method is particularly advantageous for soldering a P-side down ridge wave-guide laser diode to a heat sink. The benefits include increased operational power of the laser diode, increased diode life expectancy, more consistent performance of the laser diode, and maximum heat transfer from the laser diode to the heat sink.

BRIEF DESCRIPTION OF THE DRAWINGS

The aforementioned aspects and other features of the invention are described in detail in conjunction with the accompanying drawings in which the same reference numerals are used throughout for denoting the same element, and wherein.

Figure 1:
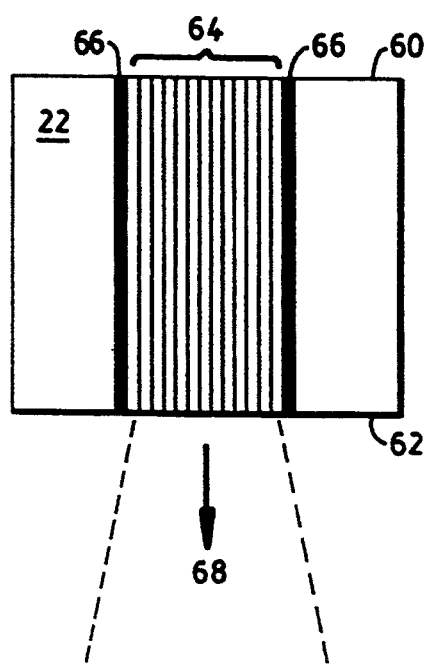
FIG. 1 is a top view of a P-side up ridge wave-guide laser diode.

The various dimensions between elements and components in the drawings are not drawn to scale.

DETAILED DESCRIPTION OF THE PREFERRED EMBODIMENTS

This invention relates generally to a method and apparatus for soldering two electronic components together to provide optimum adhesion of the solder to each surface. More particularly, the invention relates to a method and apparatus for providing optimum physical bonding and electrical contact of the solder to grooves of a ridge wave-guide laser diode bonded P-side down to a heat sink.

The following dissertation of the operation and structure of an exemplary ridge wave-guide laser diode is beneficial to the understanding of the invention and the advantages flowing therefrom. It is to be understood that the particular dimensions and materials of the structure of the ridge wave-guide laser diode and the heat sink described hereinafter are purely exemplary for a preferred embodiment of the method and apparatus of the invention. Many variations of the invention, as understood by those of ordinary skill in the art, could be provided within the breadth of the appended claims.

FIG. 1 is a top view of a ridge wave-guide laser diode 22 shown P-side up. Laser diode 22 has a striped region 64 of thirteen individual active regions separated by twelve isolation grooves, and two field regions 66. This type of laser diode is used, for instance, in printing when relatively high power laser emissions are required for image exposure at reduced print times.

Figure 2:
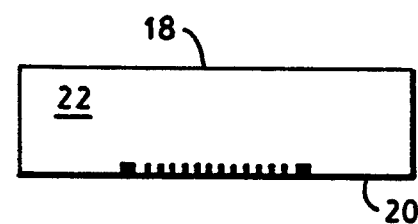
FIG. 2 is a front view of the ridge wave-guide laser diode of FIG. 1 (facing P-side down)
Figure 4:
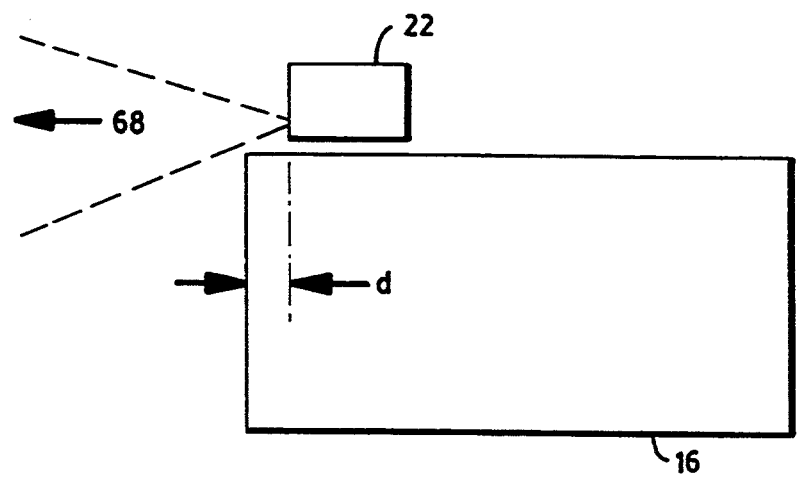
FIG. 4 is a side elevational view of a ridge wave-guide laser diode and a heat sink to be bonded together.

A front view of laser diode 22 with the P-side down is shown in FIG. 2, where the P-side surface is designated as 20 and the N-side surface is designated as 18. Typically, the laser diode 22 includes an partially transmissive surface 62 on the front of the laser diode from which laser light 68 is emitted, and a reflective surface 60 on the rear of the laser diode for preventing laser emission from the rear at the operating wavelength. Without the reflective surface 60, the laser diode 22 would emit approximately one-half the total amount of propagated light from the front and the other half of the total propagated light from the rear. However since the light which would be emitted from the rear is fed back into the laser cavity by the reflective surface 60, nearly 100% of the total light propagated (except for some nominal loss) is emitted through the front partially transmissive surface 62. Each of the thirteen active regions of the striped region 64 represents a single laser diode, but the accumulation of the active regions results in a fairly homogeneous and contiguous wide band 68 of laser light which spreads while moving further away from the partially transmissive surface 62. The wide band 68 diverges both horizontally and vertically as illustrated by dotted lines shown in FIGS. 1 and 4.

Figure 3:
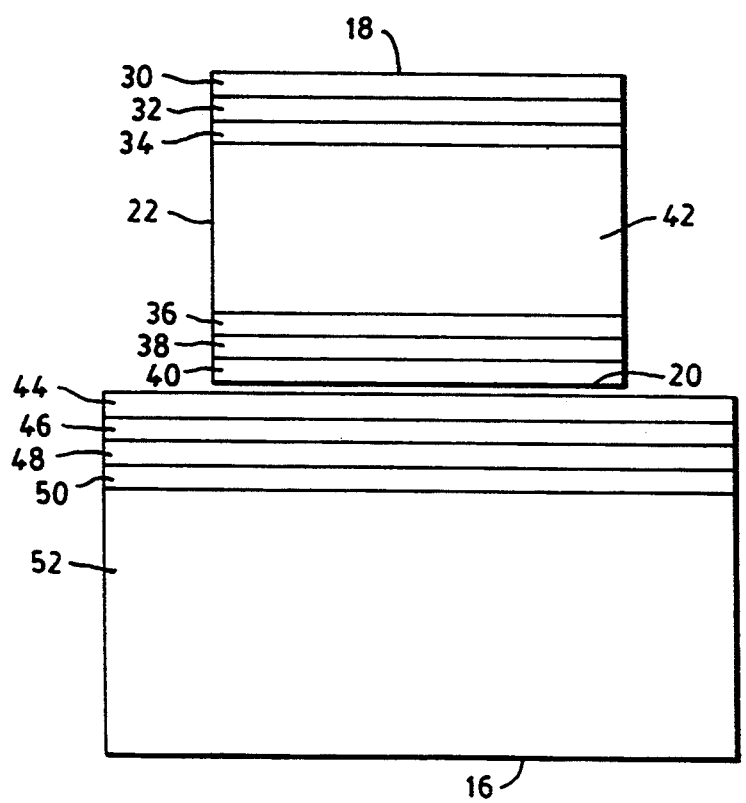
FIG. 3 is a diagrammatic elevation showing the material structure of a ridge wave-guide laser diode and a heat sink to be bonded together.

The materials used to construct both the laser diode 22 and the heat sink 16 shown in FIG. 3, are carefully selected to ensure proper electrical and physical bonding between the two electrical components. Laser diode 22 includes a gallium arsenide substrate 42 with identical metalization of both the P-side surface 20 and the N-side surface 18. Titanium layers 34, 36 are bonded onto the gallium arsenide substrate 42, followed by layers 32, 38 of platinum and layers 30, 40 of sputtered gold. The titanium layers 34, 36 bond well with both the gallium arsenide substrate 42 and the platinum layers 32, 38; the platinum layers 32, 38 bond well with both the titanium layers 34, 36 and the gold layers 30, 40; and the gold layers 30, 40 offer exceptionally low resistance for use as electrical contacts.

The heat sink 16 in FIG. 3 is constructed with a low impedance copper substrate 52 which is metalized by a nickel layer 50 acting as a metal barrier to keep copper atoms from migrating to the laser diode 22, which eventually could lead to laser diode failure. A gold layer 48 is plated onto the nickel layer 50 to provide low electrical resistance, i.e. excellent electrical conductivity with very low loss. A platinum layer 46 is bonded onto the gold layer 48 followed by an indium solder layer 44. Indium is a soft metal which can be applied in a very thin solder bead and, as such, is conventionally useful for soldering microelectronic components.

Figure 5:
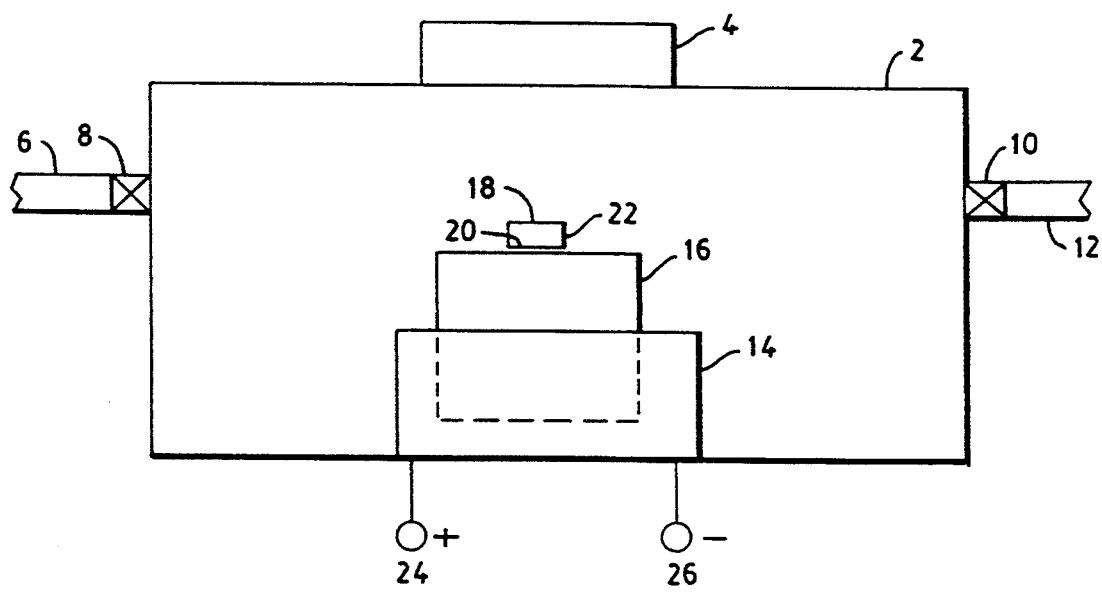
FIG. 5 shows a diagrammatic apparatus for performing the method of the invention.

FIG. 5 shows a cross-sectional view of an apparatus for bonding two electronic components according to a method of the invention. A chamber 2 includes a lid 4 which allows placement of a heat sink 16 into a clamp mount 14, and placement of the ridge wave-guide laser diode 22 onto the heat sink 16. The ridge wave-guide laser diode 22 must be positioned no further than a distance d from the edge of the heat sink 16 to prevent the edge from occluding any portion of the laser beam 68 being emitted from the striped region 64 (see FIG. 4). For the preferred embodiment, the P-side 20, including the grooves of the striped region 64 and the field regions 66, is placed downward into intimate contact with the upper surface, i.e. the indium layer, of the heat sink 16. The bonding apparatus of FIG. 5 also includes a gas line 6 with an on/off valve 8, a vacuum line 12 with an on/off valve 10, and terminals 24, 26 for providing electrical current to heat the chamber 2.

Figure 6:
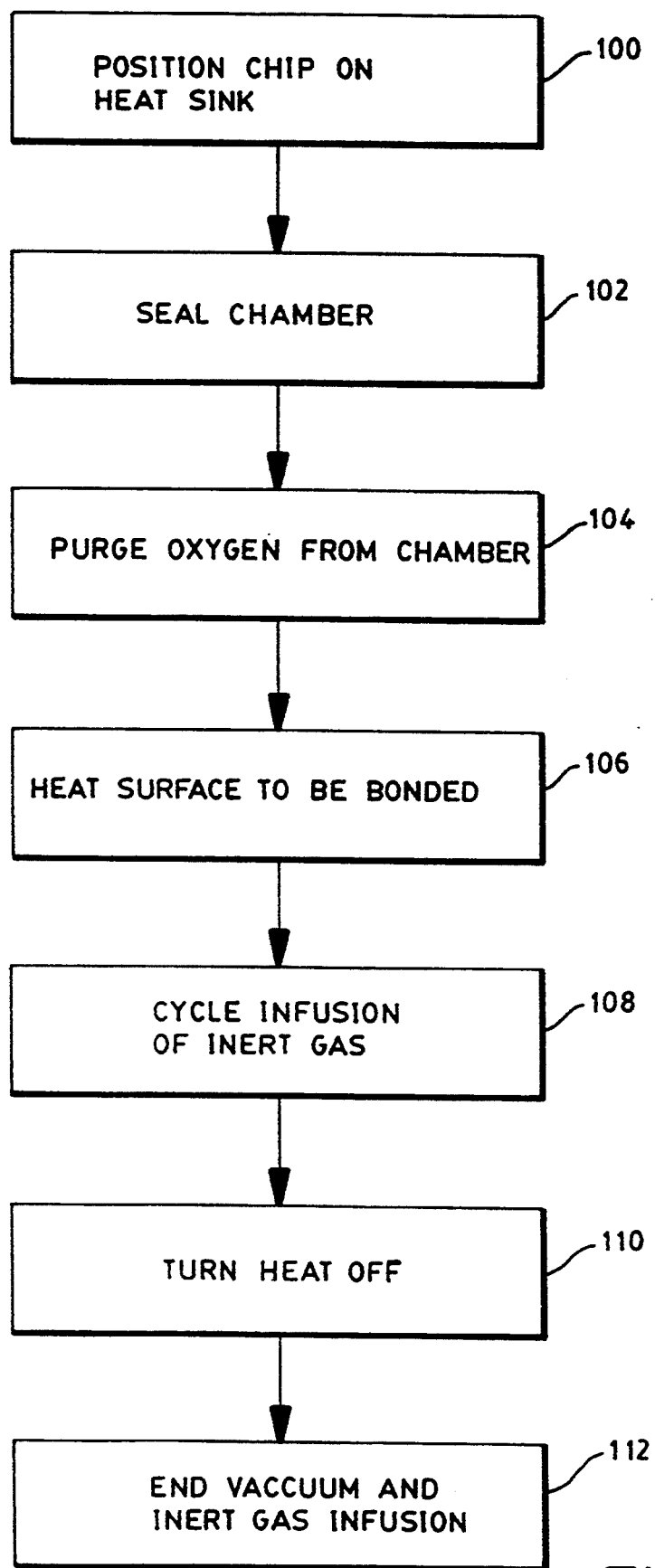
FIG. 6 is a flow-chart showing the steps of a preferred embodiment of a method of the invention.
Figure 7:
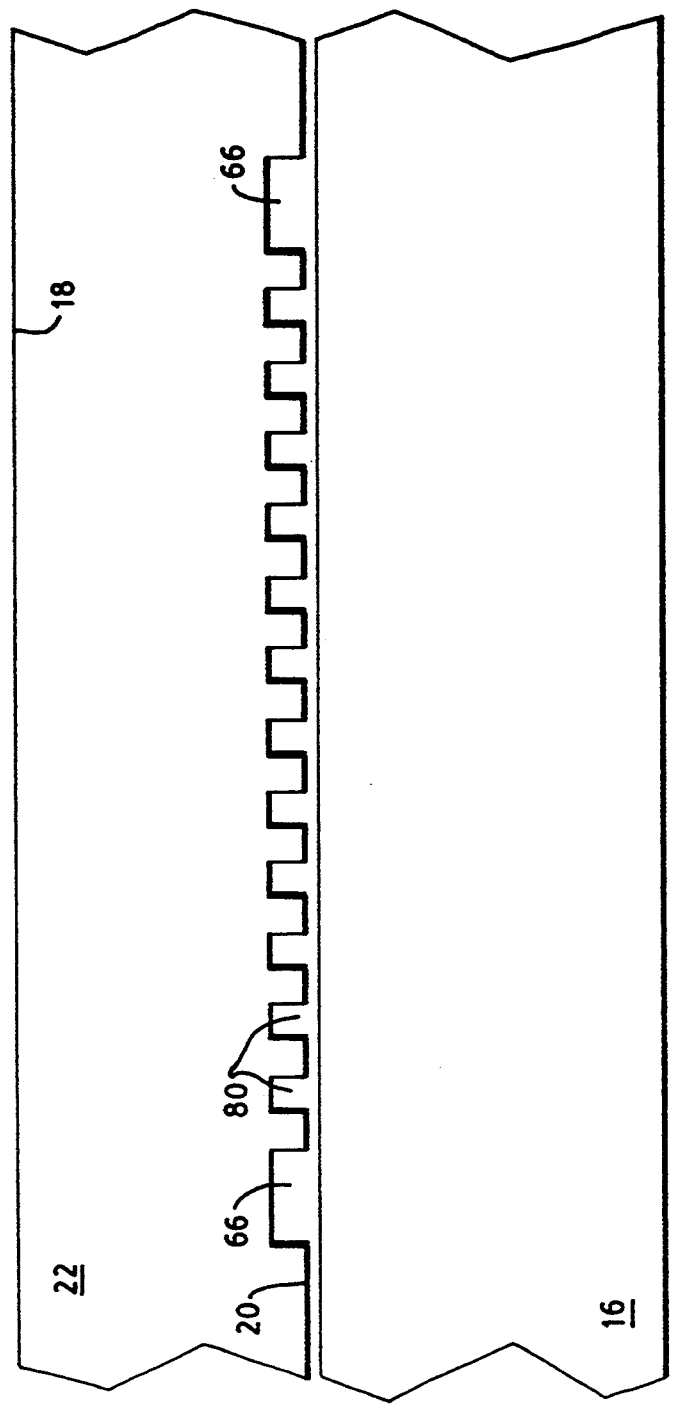
FIG. 7 is an enlarged diagrammatic front elevational view of a ridge wave-guide laser diode and a heat sink, with parts broken away, to be bonded together according to the method of the invention.

Steps of the preferred method of soldering two electronic components together according to the invention are arranged in FIG. 6 in conjunction with the bonding apparatus of FIG. 5. In block 100 the laser diode, i.e. the ridge wave-guide laser diode 22, is positioned on the heat sink 16 in chamber 2 an appropriate distance d (see FIG. 4) from the edge of the heat sink 16. In this example, the laser diode 22 is placed P-side down onto the heat sink 16. Next, the chamber 2 is sealed in block 102 by closing and sealing the chamber lid 4. In block 104, oxygen is purged from the chamber 2 to prevent oxidation of the soon to be soldered electrical contacts of the laser diode 22 and the heat sink 116. The purging of oxygen is accomplished by turning on a low level vacuum in the chamber 2 by opening the valve 10 of vacuum line 12. This tends to create a vacuum in the chamber 2 by extracting or evacuating out the air. At the same time that valve 10 is opened, valve 8 is opened to feed an inert non-oxidizing gas such as nitrogen, hydrogen, or a mixture thereof from the gas line 6 to the chamber 2. Valves 8 and 10 are preferably opened simultaneously in order to fill the chamber with the non-oxidizing gas while purging the oxygen in the air through the vacuum line 12. The gas pressure within the sealed chamber 2 is maintained at about atmospheric pressure during a predetermined period required for purging the oxygen to an acceptable level. At that point in time, a power source is connected to terminals 24, 26 according to block 106, to heat the chamber 2. When chamber 2 is heated to the melting point of indium (approximately 158°), then the indium layer 44 of the heat sink begins to melt and the gas line valve 8 is continuously cycled on/off while the vacuum line valve 10 remains open to continually remove gases from the chamber 2 (block 108). The on/off cycling of the gas line valve 8 can be accomplished manually or through hardware/software automation. In fact, each step of the bonding process could easily be automated using a microprocessor and control circuitry (not shown). The fluctuation of gas pressure in the chamber 2 removes any gases in the grooves 80 of FIG. 6 so that the grooves 80 are completely filled with molten indium solder from indium layer 44 of heat sink 16. The field regions 66 and any other crevices on the soldered surfaces are also completely filled with the molten indium solder during the process. Once a predetermined amount of time has passed for properly bonding the laser diode 22 with the heat sink 16 (typically 10 to 18 seconds) then the power source is disconnected from terminals 24, 26 and the chamber 2 plus the mount clamp 14, heat sink 16, and laser diode 22 begin cooling (block 110). The vacuum line valve 10 remains open and the gas line valve 8 continues cycling as long as the indium solder is molten. Once the solder has hardened, valves 8 and 10 can be closed and the bonded assembly of the laser diode 22 and the heat sink 16 can be removed from the chamber 2 by opening lid 4 (block 112).

The method and apparatus of the invention are not limited to the specifics of the above example. Many variations of the invention as claimed are understood by those of ordinary skill in the art. These variations include, but are not limited to: soldering components having different material and structural makeups from those described above; and using different known methods for varying the pressure of the gases within the chamber 2.

What is claimed is:

1. A method of bonding a first electronic component to a second electronic component, said method comprising the steps of:

placing said first and second electronic components in intimate contact in a sealed chamber;

melting solder between an irregular surface of said first electronic component and said second electronic component;

fluctuating pressure of gases in said sealed chamber while said solder is melted; and cooling said first and second electronic components so that said melted solder solidifies.

2. The method of claim 1, wherein said melting step further comprises melting indium solder.

3. The method of claim 1, wherein said melting step is preceded by the step of extracting an oxidizing gas of said gases from said sealed chamber.

4. The method of claim 3, wherein said extracting step further comprises extraction via a vacuum line.

5. The method of claim 3, further comprising the step of filling said sealed chamber with a non-oxidizing inert gas.

6. The method of claim 5, wherein said non-oxidizing inert gas is one of nitrogen, hydrogen, and a mixture of nitrogen and hydrogen.

7. The method of claim 5, wherein said sealed chamber is filled to atmospheric pressure with said non-oxidizing inert gas.

8. A method for bonding a nonplanar surface of a ridge wave-guide laser diode to a substantially planar surface of a heat sink coated with a solder layer, said method comprising the steps of:

placing the solder layer of the heat sink in intimate contact with the nonplanar surface of the ridge wave-guide laser diode inside of a sealed chamber;

evacuating gases in the chamber to cause a predetermined level of vacuum:

introducing a non-oxidizing inert gas into the chamber;

heating the laser diode and the heat sink, causing the solder layer to become molten;

fluctuating pressure of the inert gas within the chamber to cause the molten solder to vibrate so as to completely fill in any crevices on either the planar surface of the heat sink or the nonplanar surface of the laser diode; and reducing the heat of the laser diode and the heat sink so that the solder solidifies.

9. The method of claim 8, where said introducing step further comprises introducing said non-oxidizing inert gas being one of nitrogen, hydrogen, and a mixture of nitrogen and hydrogen.

10. The method of claim 8, wherein said placing step further comprises placing an indium solder layer of the heat sink in intimate contact with the nonplanar surface of the ridge wave-guide laser diode.

11. The method of claim 8, further comprising the step of filling said sealed chamber to atmospheric pressure with said non-oxidizing inert gas.

* * * * *